US008060713B1

(12) United States Patent
Natanzon

(10) Patent No.: US 8,060,713 B1
(45) Date of Patent: Nov. 15, 2011

(54) CONSOLIDATING SNAPSHOTS IN A CONTINUOUS DATA PROTECTION SYSTEM USING JOURNALING

(75) Inventor: Assaf Natanzon, Ramat-Gan (IL)

(73) Assignee: EMC (BENELUX) B.V., S.A.R.L. (LU)

( * ) Notice: Subject to any disclaimer, the term of this patent is extended or adjusted under 35 U.S.C. 154(b) by 901 days.

(21) Appl. No.: 12/057,652

(22) Filed: Mar. 28, 2008

Related U.S. Application Data

(63) Continuation-in-part of application No. 11/609,560, filed on Dec. 12, 2006, now Pat. No. 7,774,565.

(60) Provisional application No. 60/752,665, filed on Dec. 21, 2005.

(51) Int. Cl.
*G06F 12/00* (2006.01)
*G06F 13/00* (2006.01)
*G06F 13/28* (2006.01)

(52) U.S. Cl. .......... 711/162; 711/E12.001; 711/E12.003

(58) Field of Classification Search .................. None
See application file for complete search history.

(56) References Cited

U.S. PATENT DOCUMENTS

| | | | |
|---|---|---|---|
| 5,170,480 | A | 12/1992 | Mohan et al. |
| 5,388,254 | A | 2/1995 | Betz et al. |
| 5,499,367 | A | 3/1996 | Bamford et al. |
| 5,864,837 | A | 1/1999 | Maimone |
| 5,879,459 | A | 3/1999 | Gadgil et al. |
| 5,990,899 | A | 11/1999 | Whitten |
| 6,042,652 | A | 3/2000 | Hyun et al. |
| 6,065,018 | A | 5/2000 | Beier et al. |
| 6,143,659 | A | 11/2000 | Leem |
| 6,148,340 | A | 11/2000 | Bittinger et al. |
| 6,174,377 | B1 | 1/2001 | Doering et al. |
| 6,174,809 | B1 | 1/2001 | Kang et al. |
| 6,203,613 | B1 | 3/2001 | Gates et al. |
| 6,260,125 | B1 | 7/2001 | McDowell |
| 6,270,572 | B1 | 8/2001 | Kim et al. |

(Continued)

FOREIGN PATENT DOCUMENTS

EP         1154358         11/2001

(Continued)

OTHER PUBLICATIONS

Notice of Allowance dated Oct. 5, 2010 for U.S. Appl. No. 11/964,198, filed Dec. 26, 2007, 8 pages.

(Continued)

*Primary Examiner* — Pierre-Michel Bataille
*Assistant Examiner* — Matthew Chrzanowski
(74) *Attorney, Agent, or Firm* — Daly, Crowley, Mofford & Durkee, LLP

(57) ABSTRACT

In one aspect, a method of consolidating snapshots includes storing snapshots using a journal in a continuous data protection environment. Each entry of the journal corresponds to one of a unique group of DO METADATA stream data blocks and a unique group of UNDO METADATA stream data blocks. The method also includes receiving a user input designating at least two snapshots to consolidate, storing changes to the data blocks from the at least two snapshots in a temporary stream on the journal and consolidating the at least two snapshots by replacing the at least two snapshots in the journal with a single consolidated snapshot comprising the changes for each data block from the temporary stream. Storing changes includes storing one of the oldest changes of the UNDO METADATA stream data blocks and the latest changes of the DO METADATA stream data blocks.

19 Claims, 16 Drawing Sheets

U.S. PATENT DOCUMENTS

| | | | |
|---|---|---|---|
| 6,272,534 B1 | 8/2001 | Guha | |
| 6,287,965 B1 | 9/2001 | Kang et al. | |
| 6,467,023 B1 | 10/2002 | DeKoning et al. | |
| 6,574,657 B1 | 6/2003 | Dickinson | |
| 6,621,493 B1 | 9/2003 | Whitten | |
| 6,804,676 B1 | 10/2004 | Bains, II | |
| 6,877,109 B2* | 4/2005 | Delaney et al. | 714/6.32 |
| 6,947,981 B2 | 9/2005 | Lubbers et al. | |
| 7,043,610 B2* | 5/2006 | Horn et al. | 711/144 |
| 7,076,620 B2 | 7/2006 | Takeda et al. | |
| 7,111,197 B2 | 9/2006 | Kingsbury et al. | |
| 7,117,327 B2 | 10/2006 | Hirakawa et al. | |
| 7,120,768 B2 | 10/2006 | Mizuno et al. | |
| 7,130,975 B2 | 10/2006 | Suishu et al. | |
| 7,139,927 B2 | 11/2006 | Park et al. | |
| 7,159,088 B2 | 1/2007 | Hirakawa et al. | |
| 7,167,963 B2 | 1/2007 | Hirakawa et al. | |
| 7,222,136 B1 | 5/2007 | Brown et al. | |
| 7,296,008 B2* | 11/2007 | Passerini et al. | 1/1 |
| 7,328,373 B2 | 2/2008 | Kawamura et al. | |
| 7,360,113 B2 | 4/2008 | Anderson et al. | |
| 7,383,465 B1* | 6/2008 | van Rietschote et al. | 714/13 |
| 7,426,618 B2 | 9/2008 | Vu et al. | |
| 7,472,307 B2* | 12/2008 | Daniels et al. | 714/6.32 |
| 7,516,287 B2 | 4/2009 | Ahal et al. | |
| 7,519,625 B2 | 4/2009 | Honami et al. | |
| 7,519,628 B1 | 4/2009 | Leverett | |
| 7,546,485 B2 | 6/2009 | Cochran et al. | |
| 7,577,867 B2 | 8/2009 | Lewin et al. | |
| 7,606,868 B1* | 10/2009 | Le et al. | 709/211 |
| 7,606,940 B2 | 10/2009 | Yamagami | |
| 7,627,612 B2 | 12/2009 | Ahal et al. | |
| 7,627,687 B2 | 12/2009 | Ahal et al. | |
| 7,757,057 B2 | 7/2010 | Sangapu et al. | |
| 7,774,391 B1* | 8/2010 | Le et al. | 707/822 |
| 2002/0129168 A1 | 9/2002 | Kanai et al. | |
| 2003/0061537 A1 | 3/2003 | Cha et al. | |
| 2003/0110278 A1 | 6/2003 | Anderson | |
| 2003/0196147 A1 | 10/2003 | Hirata et al. | |
| 2004/0205092 A1* | 10/2004 | Longo et al. | 707/205 |
| 2004/0250032 A1 | 12/2004 | Ji et al. | |
| 2004/0254964 A1 | 12/2004 | Kodama et al. | |
| 2005/0015663 A1 | 1/2005 | Armangau et al. | |
| 2005/0028022 A1 | 2/2005 | Amano | |
| 2005/0049924 A1 | 3/2005 | DeBettencourt et al. | |
| 2005/0172092 A1 | 8/2005 | Lam et al. | |
| 2005/0273655 A1 | 12/2005 | Chow et al. | |
| 2006/0031647 A1 | 2/2006 | Hirakawa et al. | |
| 2006/0047996 A1 | 3/2006 | Anderson et al. | |
| 2006/0047999 A1* | 3/2006 | Passerini et al. | 714/6 |
| 2006/0064416 A1 | 3/2006 | Sim-Tang | |
| 2006/0107007 A1 | 5/2006 | Hirakawa et al. | |
| 2006/0117211 A1 | 6/2006 | Matsunami et al. | |
| 2006/0161810 A1 | 7/2006 | Bao | |
| 2006/0195670 A1 | 8/2006 | Iwamura et al. | |
| 2006/0212462 A1 | 9/2006 | Heller et al. | |
| 2007/0005740 A1* | 1/2007 | DiFalco et al. | 709/223 |
| 2007/0055833 A1 | 3/2007 | Vu et al. | |
| 2007/0162513 A1 | 7/2007 | Lewin et al. | |
| 2007/0162520 A1* | 7/2007 | Petersen et al. | 707/202 |
| 2007/0180304 A1 | 8/2007 | Kano | |
| 2007/0198602 A1 | 8/2007 | Ngo et al. | |
| 2007/0198791 A1 | 8/2007 | Iwamura et al. | |
| 2007/0220311 A1 | 9/2007 | Lewin et al. | |
| 2007/0266053 A1 | 11/2007 | Ahal et al. | |
| 2008/0082591 A1 | 4/2008 | Ahal et al. | |
| 2008/0082592 A1 | 4/2008 | Ahal et al. | |
| 2008/0082770 A1 | 4/2008 | Ahal et al. | |
| 2010/0036886 A1* | 2/2010 | Bouloy et al. | 707/200 |

FOREIGN PATENT DOCUMENTS

| | | |
|---|---|---|
| EP | 1 154 356 | 11/2010 |
| WO | WO 00 45581 A3 | 8/2000 |

OTHER PUBLICATIONS

Linux Filesystems, Sams Publishing, 2002, pp. 17-22 and 67-71.

Bunyan, Multiplexing in a BrightStor® ARCserve® Backup Release Mar. 11, 2004, pp. 1-4.

Marks, "Network Computing", Feb. 2, 2006, pp. 1-9.

Hill, Network Computing, Jun. 8, 2006, pp. 1-9.

Issue Fee transmittal (PTOL-085B, Part B) with Comments on Statement for Reasons for Allowance dated Oct. 12, 2010 for U.S. Appl. No. 11/964,198, filed Dec. 26, 2007, 2 pages.

Microsoft Computer Dictionary, 2002 Press Fifth Edition, p. 58.

U.S. Appl. No. 11/536,160, filed Sep. 28, 2006 file downloaded Jun. 4, 2009 through Jan. 12, 2010, 50 pages.

U.S. Appl. No. 10/512,687, filed Aug. 24, 2005, file downloaded Jun. 4, 2009 through Jan. 12, 2010, 48 pages.

U.S. Appl. No. 11/609,561, filed Dec. 12, 2006, file downloaded Jun. 4, 2009 through Jan. 12, 2010, 46 pages.

U.S. Appl. No. 11/356,920, filed Feb. 17, 2006, file downloaded Jun. 4, 2009 through Jan. 12, 2010, 4 pages.

U.S. Appl. No. 11/536,215, filed Nov. 28, 2006, file downloaded Jun. 4, 2009 through Jan. 12, 2010, 2 pages.

U.S. Appl. No. 11/536,233, filed Nov. 28, 2006, file downloaded Jun. 4, 2009 through Jan. 12, 2010, 43 pages.

Gibson, Five Point Plan Lies at the Heart of Compression Technology, Apr. 29, 1991, p. 1.

Soules, Metadata Efficiency in Versioning File Systems, 2003, pp. 1-16.

Aix System Management Concepts: Operating Systems and Devices May 2000, pp. 1-280.

U.S. Appl. No. 11/964,168, filed Dec. 26, 2007, file through Jul. 13, 2010, 364 pages.

U.S. Appl. No. 11/609,561, filed Dec. 12, 2006, file from Jan. 15, 2009 through Jul. 14, 2010, 56 pages.

U.S. Appl. No. 10/512,687, filed Aug. 24, 2005, 129 pages.

U.S. Appl. No. 11/536,215, Sep. 28, 2006, 22 pages.

Yair Heller, et al.; "Apparatus for Continuous Compression of Large Volumes of Data," U.S. Appl. No. 60/375,007, filed Apr. 25, 2002, 16 pages.

Soules et al.; "Metadata Efficiency in a Comprehensive Versioning File System", May 2002, CMU-CS-02-145, School of Computer Science, Carnegie Mellon University, Pittsburgh, PA 15213, 33 pages.

U.S. Appl. No. 11/609,560, filed Dec. 12, 2006, file downloaded Aug. 25, 2010, 265 pages.

U.S. Appl. No. 11/609,561, filed Dec. 12, 2006, file downloaded Aug. 25, 2010, 13 pages.

U.S. Appl. No. 11/964,198, filed Dec. 26, 2007, file downloaded Aug. 25, 2010, 195 pages.

U.S. Appl. No. 11/964,193, filed Dec. 26, 2007, file downloaded Aug. 25, 2010, 169 pages.

U.S. Appl. No. 11/964,228, filed Dec. 26, 2007, file downloaded Aug. 25, 2010, 62 pages.

U.S. Appl. No. 11/964,138, filed Dec. 26, 2007, file downloaded Aug. 25, 2010, 114 pages.

U.S. Appl. No. 11/964,216, filed Dec. 26, 2007, file downloaded Aug. 25, 2010, 204 pages.

Michael Lewin; "Any Point in Time Data Access and Recovery;" U.S. Appl. No. 60/752,665, filed Dec. 21, 2005.

Shlomo Ahal; "Multiple Points in Time Data Access," U.S. Appl. No. 60/753,263, filed Dec. 22, 2005.

U.S. Appl. No. 11/609,560, filed Dec. 12, 2006, file through Jan. 13, 2009, 443 pages.

U.S. Appl. No. 11/609,561, filed Dec. 12, 2006, file through Jan. 15, 2009, 435 pages.

U.S. Appl. No. 11/356,920, filed Feb. 17, 2006, 525 pages.

U.S. Appl. No. 10/512,687, filed Aug. 24, 2005, 301 pages.

U.S. Appl. No. 11/536,215, filed Sep. 28, 2006, file through Jan. 13, 2009, 145 pages.

U.S. Appl. No. 11/536,233, filed Sep. 28, 2006, file through Jan. 13, 2009, 142 pages.

U.S. Appl. No. 11/536,160, filed Sep. 28, 2006, file through Jan. 14, 2009, 116 pages.

* cited by examiner

Journal Volume Segments at Stage 1

| Block No. | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| Segment #1 → | ID=1: 15 Blocks of Do Data | | | | | | | | | | | | | | | ID=2: 5 Blocks of Do Data | | | | |
| Segment #2 → | ID=1: 1 Block of Do Metadata | ID=2: 1 Block of Do Metadata | ID=3: 1 Block of Do Metadata | | | | | | | | | | | | | | | | | |
| Segment #3 → | ID=2: 15 Blocks of Do Data | | | | | | | | | | | | | | | ID=3: 5 Blocks of Do Data | | | | |
| Segment #4 → | ID=3: 15 Blocks of Do Data | | | | | | | | | | | | | | | | | | | |

The Four Streams

Do Stream Includes Segment #1, #3 and #4, Begins at Segment #1, Block #0 and Ends at Segment #4, Block #15
Do Metadata Stream Includes Segment #2, Begins at Segment #2, Block #0 and Ends at Segment #2, Block #3
Undo Stream is Empty
Undo Metadata Stream is Empty

*FIG. 2B*

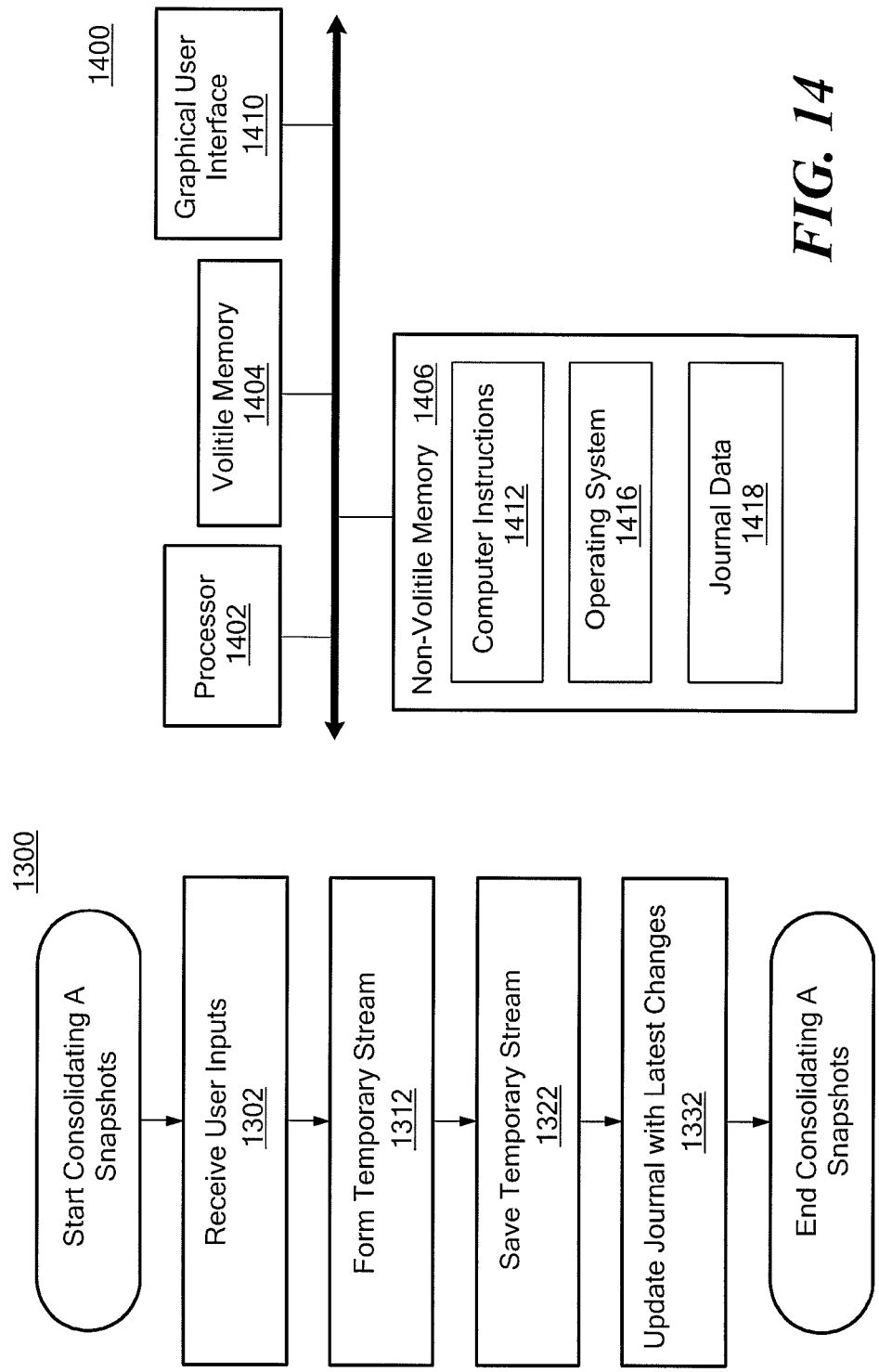

CONSOLIDATING SNAPSHOTS IN A CONTINUOUS DATA PROTECTION SYSTEM USING JOURNALING

RELATED APPLICATIONS

This patent application is a continuation-in-part to application Ser. No. 11/609,560 filed Dec. 12, 2006 now U.S. Pat. No. 7,774,565 and entitled "METHODS AND APPARATUS FOR POINT IN TIME DATA ACCESS AND RECOVERY," which claims priority to Application Ser. No. 60/752,665 filed Dec. 21, 2005 and entitled "ANY POINT IN TIME DATA ACCESS AND RECOVERY" and both applications are incorporated herein in their entirety.

BACKGROUND

As is known in the art, computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational data on a periodic basis. Such systems suffer from several drawbacks. First, they require a system shutdown during backup, since the data being backed up cannot be used during the backup operation. Second, they limit the points-in-time to which the organization to recover. For example, if data is backed up on a daily basis, there may be several hours of lost data in the event of a disaster. Third, the data recovery process itself takes a long time.

Another conventional data protection system uses data replication, by creating a copy of the organization's data on a secondary backup storage system, and updating the backup occur with changes. The backup storage system may be situated in the same physical location as the production storage system, or in a physically remote location. Data replication systems generally operate either at the application level, or at the file system level, or at the data block level.

Current data protection systems try to provide continuous data protection, which enable the organization to roll back to any specified point-in-time within a recent history. Continuous data protection systems aim to satisfy two conflicting objectives, as best as possible; namely, (i) minimize the down time, in which the organization data is unavailable, during a recovery, and (ii) enable recovery as close a possible to any specified point-in-time within a recent history.

Continuous data protection typically uses a technology referred to as "journaling", whereby a log is kept of changes made to the backup storage. During a recovery, the journal entries serve as successive "undo" information, enabling rollback of the backup storage to previous points-in-time. Journaling was first implemented in database systems, and was later extended to broader data protection.

SUMMARY

In one aspect, a method of consolidating snapshots includes storing snapshots using a journal in a continuous data protection environment. Each entry of the journal corresponds to one of a unique group of DO METADATA stream data blocks and a unique group of UNDO METADATA stream data blocks. The method also includes receiving a user input designating at least two snapshots to consolidate, storing changes to the data blocks from the at least two snapshots in a temporary stream on the journal and consolidating the at least two snapshots by replacing the at least two snapshots in the journal with a single consolidated snapshot comprising the changes for each data block from the temporary stream. Storing changes includes storing only the oldest changes to each disk block in the UNDO METADATA stream data blocks and the latest changes of the DO METADATA stream data blocks.

In another aspect, an apparatus to consolidate snapshots includes circuitry to store snapshots using a journal in a continuous data protection environment. Each entry of the journal corresponds to one of a unique group of DO METADATA stream data blocks and a unique group of UNDO METADATA stream data blocks. The apparatus also includes circuitry to receive a user input designating at least two snapshots to consolidate, store changes to the data blocks from the at least two snapshots in a temporary stream on the journal, storing changes comprising storing one of the oldest changes of the UNDO METADATA stream data blocks and the latest changes of the DO METADATA stream data blocks; and consolidate the at least two snapshots by replacing the at least two snapshots in the journal with a single consolidated snapshot comprising the changes for each data block from the temporary stream.

BRIEF DESCRIPTION OF THE DRAWINGS

FIGS. 2B-2E are illustrations of various stages of generation of a journal history in a detailed example.

FIG. 13 is a flowchart of an example of a process to consolidate snapshots in a continuous data protection system using journaling.

FIG. 14 is a computer on which the process of FIG. 13 may be implemented.

DETAILED DESCRIPTION

Figure 1:
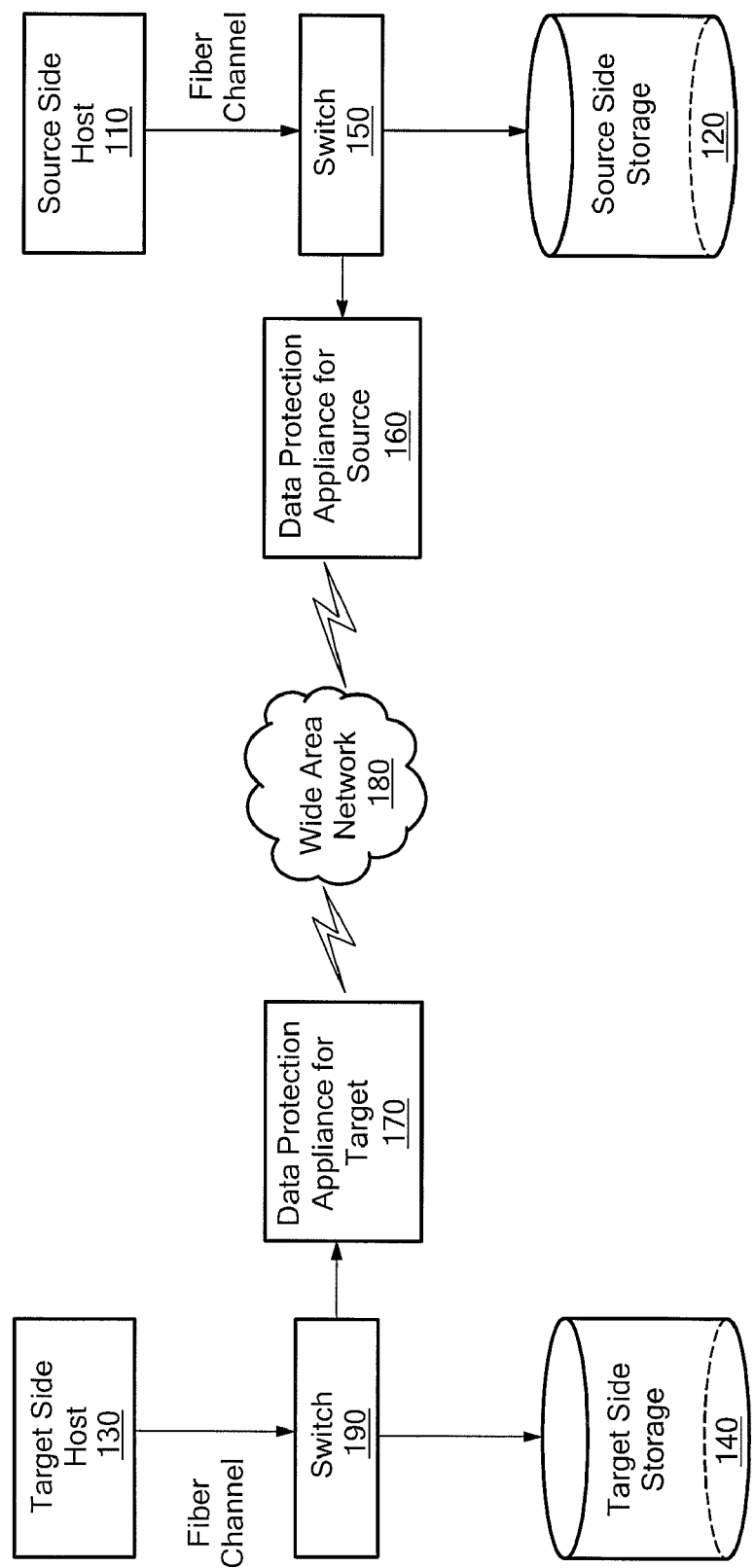
FIG. 1 is a block diagram of an example of a data protection system.

FIG. 1 is a block diagram of a data protection system 10 including components arranged into two groups; namely, source side components on the left, and target side components on the right. The source side represents a production site with a host computer 110 running a host application, and a storage system 120 storing host data in addressable storage locations. The target represents a data replication site, with its own host computer 130, and its own storage system 140 that is used to store a copy of the data in storage system 120, as well as additional data.

The source and target sides are connected via a wide area network (WAN) 180. Each host computer and its corresponding storage system are coupled through a storage area network (SAN) that includes network switches, such a fiber channel switches. The communication links between each host computer and its corresponding storage system, may be any appropriate medium suitable for data transfer, such as fiber communication channel links.

Host computers 110 and 130 may each be implemented as one computer, or as a plurality of computers, or as a network of distributed computers. Generally, a host computer runs one or more applications, such as database applications and e-mail servers. Each storage system 120 and 140 includes one or more physical storage devices, such as single disks or redundant arrays of inexpensive disks (RAID). Storage system 140 generally includes a copy of storage system 120, as well as additional data.

In the course of continuous operation, host computer 110 issues I/O requests (write/read operations) to storage system 120 using, for example, small computer system interface (SCSI) commands. Such requests are generally transmitted to storage system 120 with an address that includes a specific device identifier, an offset within the device, and a data size. Offsets are generally granularized to 512 byte blocks. The average size of a write operation issued by the host computer may be, for example, 10 kilobytes (KB); i.e., 20 blocks. For an I/O rate of 50 megabytes (MB) per second, this corresponds to approximately 5,000 write transactions per second.

A replica of write operations issued by host computer 110 to storage system 120 is transmitted to a source-side data protection appliance (DPA) 160. In one example, DPA 160 and its counterpart at the target side DPA 170 include their own internal memories and computing processors. In the architecture illustrated in FIG. 1 the DPAs are standalone devices integrated within a SAN. Alternatively, the DPAs may be integrated into the respective storage systems, or integrated into the respective host computers. The DPAs communicate with their respective hosts through communication lines such as fiber channels.

DPA 160 and DPA 170 are "initiators"; i.e., the DPAs can issue I/O requests using, for example, SCSI commands, to storage devices of their respective storage systems. Specifically, the DPAs may issue I/O requests to one or more storage devices of their respective storage systems, referred to as "journal volumes". The DPAs are also programmed with the necessary functionality to act as a "target"; i.e., to reply to I/O requests, such as SCSI commands, issued by other initiators, such as their respective host computer.

DPA 160 sends write transactions over a wide area network 180 to a second DPI 170 at the target side, for incorporation within target storage system 140. DPA 160 may send its write transactions to DPA 170 using a variety of modes of transmission, including inter alia (i) a synchronous mode, (ii) an asynchronous mode, and (iii) a snapshot mode. In synchronous mode, DPA 160 sends each write transaction to DPA 170, receives back an acknowledgement, and in turns sends an acknowledgement back to host computer 110. Host computer waits until receipt of such acknowledgement before issuing further write transactions. In asynchronous mode, DPA 160 sends an acknowledgement to host computer 110 upon receipt of each write transaction, before receiving an acknowledgement back from DPA 170. In snapshot mode, DPA 160 receives several write transactions and combines them into an aggregate "snapshot" of all write activity performed in the multiple write transactions, and sends such snapshots to DPA 170, for incorporation in target storage system 140.

For the sake of clarity, the ensuing discussion assumes that information is transmitted at a write-by-write granularity. During normal operations, the direction of replicate data flow goes from source side to target side. Generally, during data recovery the direction of replicate data flow is reversed, with the target side behaving as if it were the source side, and vice versa. To this end, the target side also includes a switch 190, making the target side symmetric with the source side.

DPA 160 is operative to send write transactions from the source side to the target side. DPA 170 is operative to maintain a journal history of write transactions, as described in detail herein. Journal histories maybe stored in a journal volume. Such journal volume may include one or more physical storage device units, or it may be a part of a storage system. The size of the journal volume determines the size of a journal history that can be stored. A possible size for a journal volume is 500 GB. Since the source side has the capability to act as a target side, a journal volume is also defined at the source side.

It is understood that the exemplary system shown in FIG. 1 is intended to be representative of a data protection system, and actual systems may vary in architecture and network topology. Additional safety measures may be used in such a system. Thus, each DPA may in fact be a cluster of computers, thereby ensuring that if a DPA computer is down, then the DPA functionality switches over to another computer.

It is further understood that in practice the architecture may vary from one organization to another. Thus, although the target side is illustrated as being remote from the source side in FIG. 1, in some systems the two sides may be at the same local site. Local data replication is faster than remote data replication, and the lag between target and source is minimal, but remote data replication has the advantage of being robust in the event that a disaster occurs at the source side. The system described herein may be implemented within a source side architecture alone, without there being a target side.

Figure 2A:
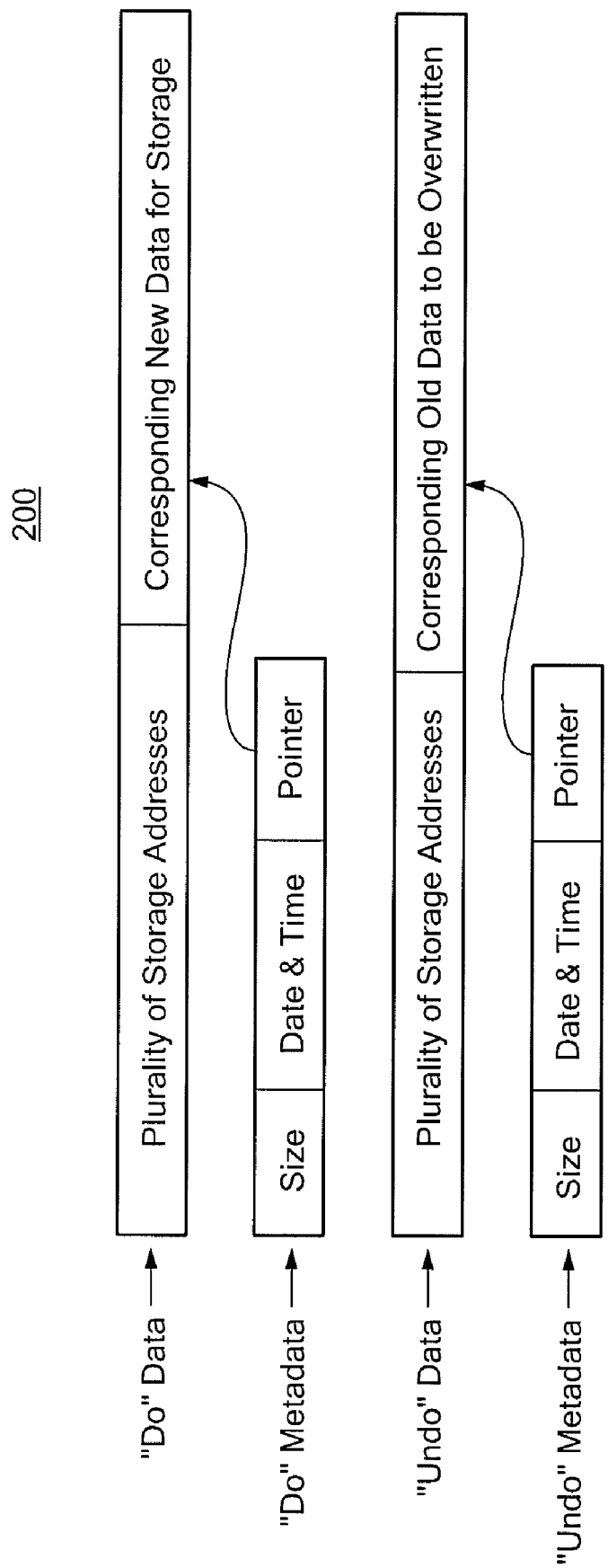
FIG. 2A is an illustration of a journal history of write transactions for a storage system.

Reference is now made to FIG. 2A, which is a simplified illustration of a journal history 200 of write transactions for a storage system. A write transaction generally includes the following fields:

a time at which the transaction was received by the source side DPA;

a write length;

a location in the storage system to which the data is written; and the data itself.

Write transactions are transmitted from source side DPA 160 to target side DPA 170. DPA 170 preferably records the received write transactions in four streams. A first stream, referred to as a DO stream, includes new data for writing in the storage system. A second stream, referred to as an DO METADATA stream, includes metadata for the write transaction, such as an identifier, a date & time, a write size, a beginning address in the data volume for writing the new data in, and a pointer to the offset in the do stream where the corresponding data is located. Similarly, a third stream, referred to as an UNDO stream, includes old data that is overwritten in the data volume; and a fourth stream, referred to as an UNDO METADATA, include an identifier, a date & time, a write size, a beginning address in the data volume where data is to be overwritten, and a pointer to the offset in the undo stream where the corresponding old data is located.

In practice each of the four streams holds a plurality of write transaction data. As write transactions are received dynamically by target DPA 170, they are recorded at the end of the DO stream and the end of the DO METADATA stream, prior to committing the transaction. During transaction application, when the various write transactions are applied to the storage system, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream for writing into addresses within the storage system. Prior to writing the UNDO data into these addresses, the newer data residing in such addresses is recorded in the DO stream.

More specifically, journal history 200 is stored within a specific storage volume, or striped over several volumes, referred to collectively as a "journal volume". Journal history 200 may have its own partition within a volume.

The journal volume can be partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers: a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 170, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

When a write transaction is received, journaling is thus advanced as follows.

Step 1: The new data is written at the end of the DO stream, assuming a forward write direction, and corresponding metadata is written at the end of the DO METADATA stream.

Step 2: Data is read from the beginning of the DO stream, and corresponding metadata is read from the beginning of the DO METADATA stream.

Step 3: Old data to be overwritten is read from the storage system. The location and size of such old data is determined from the DO METADATA stream.

Step 4: The old data is written at the end of the UNDO stream, and corresponding metadata is written at the end of the UNDO METADATA stream.

Step 5: The new data read at step 2 is written into the storage system, and the beginning and end pointers of the DO and DO METADATA streams are moved appropriately.

Conversely, during a rollback to undo a write transaction, the above operations are reversed, as follows:

Step 1: Read the data and metadata from the end of the UNDO and UNDO METADATA streams.

Step 2: Read from the storage system the data that is to be overwritten. The location and size of such data is determined from the UNDO METADATA stream.

Step 3: Write the data from step 2 at the beginning of the DO stream, and update the DO METADATA stream accordingly.

Step 4: Write the data from step 1 to the storage system, and update the beginning and end pointers of the UNDO and UNDO metadata streams appropriately.

The following example, in conjunction with FIGS. 2B-2E, describes further details of the journaling process. A journal volume includes a plurality of segments from a segment pool, each segment including 20 data blocks.

Three write transactions are received, as indicated in TABLE I.

TABLE I

Example Write Transactions

| Write ID | Group ID | Time | Data volume location | Length | Journal volume location |
|---|---|---|---|---|---|
| 1 | 1 | Dec. 03, 2005 10:00:00.00 | Vol. 1, offset 57 blocks | 15 blocks | Segment 1, offset 0 |
| 2 | 1 | Dec. 03, 2005 10:00:00.05 | Vol. 1, offset 87 blocks | 20 blocks | Segment 1, offset 15 |
| 3 | 1 | Dec. 03, 2005 10:00:00.18 | Vol. 2, offset 12 blocks | 20 blocks | Segment 3, Offset 15 |

The following discussion describes four stages of journaling and data storage; namely, Stage #1: Enter the three write transactions as journal entries in the journal volume.

Stage #2: Apply the first write transaction to the data volume.

Stage #3: Apply the second write transaction to the data volume.

Stage #4: Rollback the second write transaction, to recover data from an earlier point-in-time.

The write transaction with ID=1 is written to the first 15 blocks of Segment #1. The metadata corresponding to this transaction is written to the first block of Segment #2. The second write transaction with ID=2 is written to the last 5 blocks of Segment #1 and the first 15 blocks of Segment #3. The metadata corresponding to this transaction is written to the second block of Segment #2. The third write transaction with ID=3 is written to the last 5 blocks of Segment #3 and the first 15 blocks of Segment #4. The metadata corresponding to this transaction is written to the third block of Segment #2.

Thus at stage #1, the DO stream in memory includes a list of segments 1, 3, 4; and a beginning pointer to offset=0 in Segment #1 and an end pointer to offset=10 in Segment #4. The DO METADATA stream in memory includes a list of one segment, namely Segment #2; and a beginning pointer to offset=0 in Segment #2 and an end pointer to offset=3 in Segment #2. The UNDO stream and the UNDO METADATA stream are empty. The journal history and the four streams at the end of stage #1 are illustrated in FIG. 2B.

At stage #2 the write transaction with ID=1 is applied to the storage system. New data to be written is read from the journal volume at the offset and length indicated in the DO METADATA; namely, 15 blocks of data located in blocks 0-14 of journal volume Segment #1. Correspondingly, old data is read from the storage data volume at the offset and length indicated in the UNDO METADATA; namely, 15 blocks of data located in blocks 57-71 of Data Volume #1. The old data is then written into the UNDO stream in the journal volume, and the associated metadata is written into the UNDO METADATA stream in the journal volume. Specifically, for this example, the UNDO data is written into the first 15 blocks of Segment #5, and the UNDO METADATA is written into the first block of Segment #6. The beginning pointer of the UNDO data stream is set to offset=0 in Segment #5, and the end pointer is set to offset=15 in Segment #5. Similarly, the beginning pointer of the UNDO METADATA stream is set to offset=0 on Segment #6, and the end pointer is set to offset=1 in Segment #6.

Figure 2C:
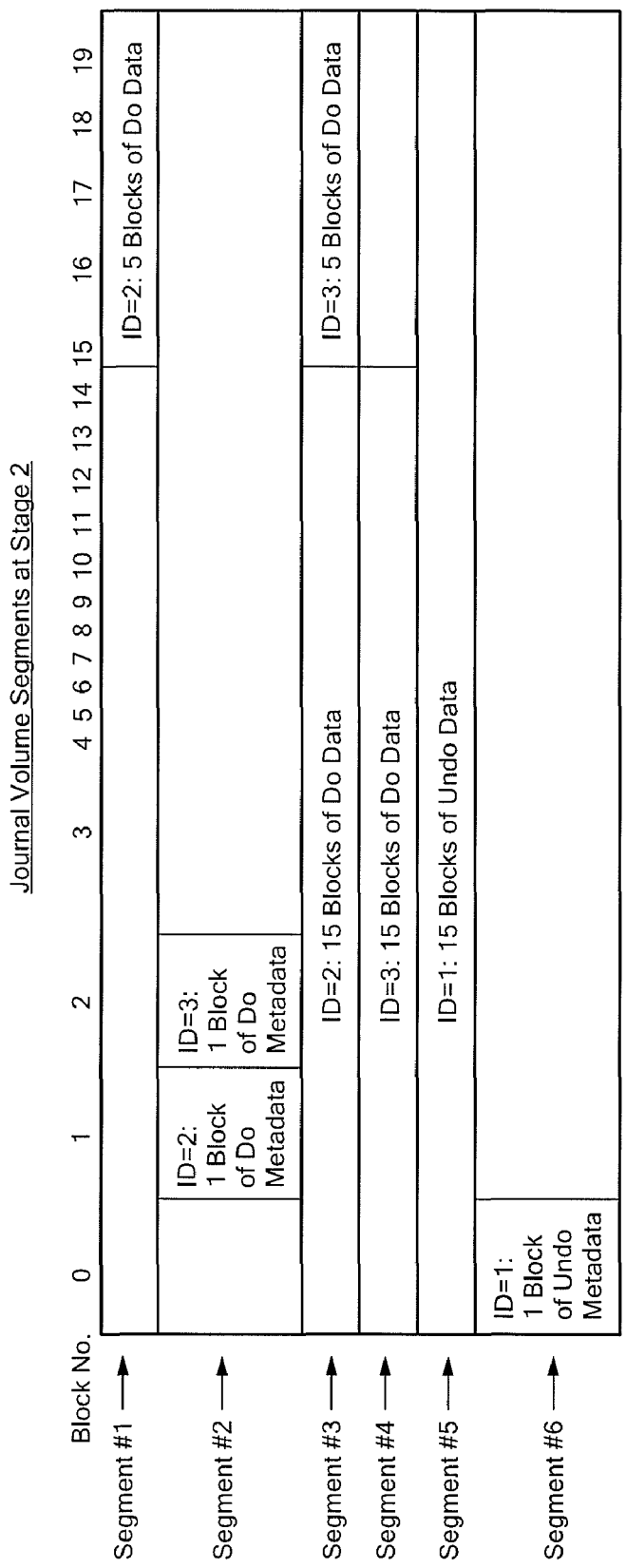

At this point, the new data that was read from blocks 0-14 of journal volume Segment #1 is written to blocks 57-71 of Data Volume #1. The beginning pointer for the DO stream is moved forward to block 15 of journal volume Segment #1, and the beginning pointer for the DO METADATA stream is moved forward to block 1 of journal volume Segment #2. The journal history and the four streams at the end of stage #2 are illustrated in FIG. 2C.

Figure 2D:
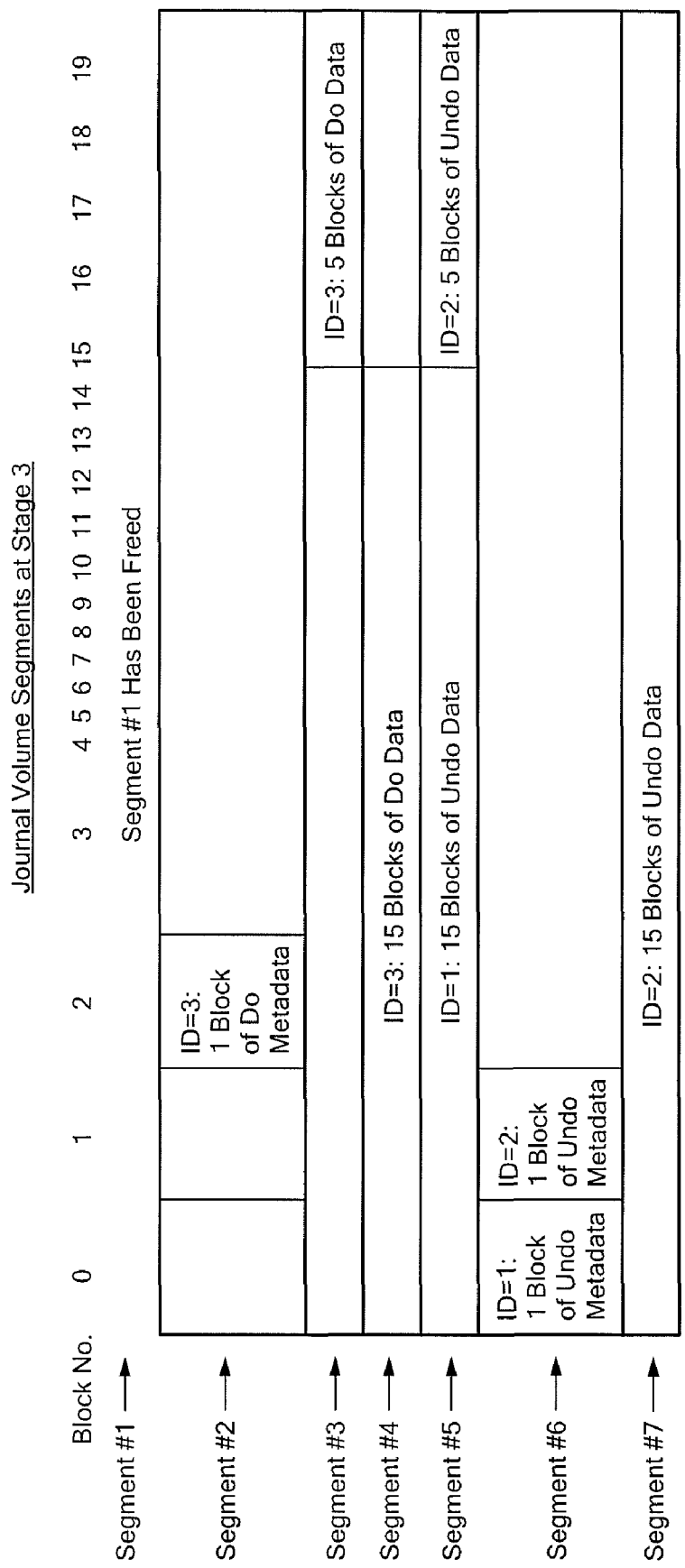

At stage #3 the write transaction with ID=2 is applied to the storage system. As above, 20 blocks of new data are read from blocks 15-19 of journal volume Segment #1 and from blocks 0-14 of journal volume Segment #3. Similarly, 20 blocks of old data are read from blocks 87-106 of Data Volume #1. The old data is written to the UNDO stream in the last 5 blocks of journal volume Segment #5 and the first 15 blocks of journal volume Segment #7. The associated metadata is written to the UNDO METADATA stream in the second block of Segment #6. The list of segments in the UNDO stream includes Segment #5 and Segment #7. The end pointer of the UNDO stream is moved to block 15 of Segment #7, and the end pointed of the UNDO METADATA stream is moved to block 2 of Segment #6. Finally, the new data from blocks 15-19 of journal volume Segment #1 and blocks 0-14 of journal volume Segment #3 is written into blocks 87-106 of Data Volume #1. The beginning pointer for the DO stream is moved forward to block 15 of journal volume Segment #3, and the beginning pointer for the DO METADATA stream is moved forward to block 2 of journal volume Segment #2. Segment #1 is freed from the DO stream, for recycling within the segment pool, and the list of segments for the DO stream is changed to Segment #3 and Segment #4. The journal history and the four streams at the end of stage #3 are illustrated in FIG. 2D.

At stage #4 a rollback to time 10:00:00.00 is performed. i.e., the write transaction with ID=2 is to be undone. The last entry is read from the UNDO METADATA stream, the location of the end of the UNDO METADATA stream being determined by its end pointer, i.e., the metadata before block 2 of journal volume Segment #6 is read, indicating two areas each of 20 blocks; namely, (a) the last 5 blocks of journal volume Segment #5 and the first 15 blocks of journal volume Segment #7, and (b) blocks 87-106 of Data Volume #1. Area (a) is part of the UNDO stream.

The 20 blocks of data from area (b) are read from Data Volume #1 and written to the beginning of the DO stream. As the beginning pointer of the DO stream is set to offset=15 of journal volume Segment #3, 15 blocks are written at the beginning of Segment #3, and the remaining 5 blocks are written to the end of Segment #8. The start pointer for the DO stream is set to block 15 of Segment #8. The list of segments for the DO stream is changed to Segment #8, Segment #3 and Segment #4. The metadata associated with the 20 blocks from area (b) is written to block 1 of Segment #2, and the end pointer of the DO METADATA stream is advanced to block 0 of Segment #2.

Figure 2E:
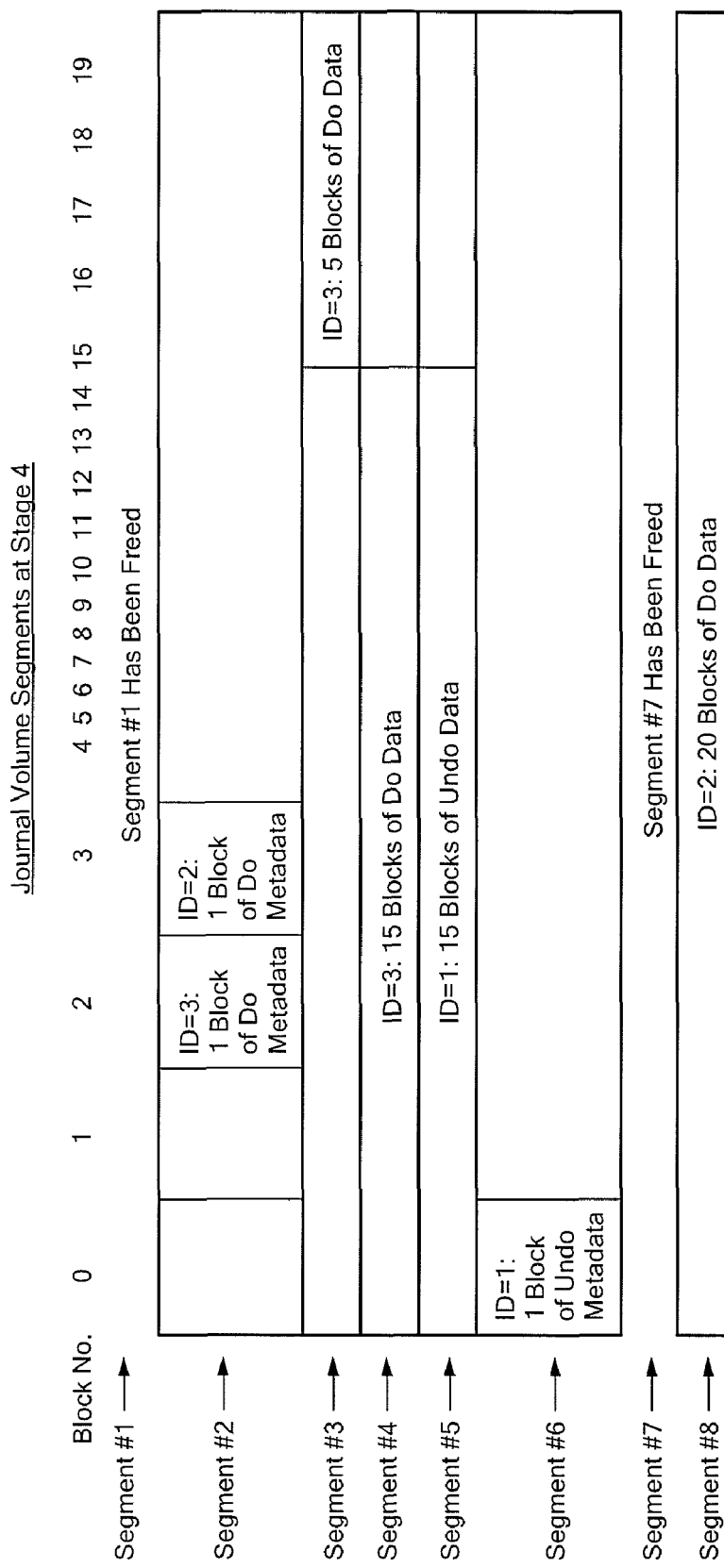

The 20 blocks of data in area (a) of the journal volume are then written to area (b) of the data volume. Finally, Segment #7 is freed for recycling in the segment pool, the UNDO stream ending pointer is moved back to Segment #5 of the journal volume, block 15, and the UNDO METADATA stream ending pointed is moved back to Segment #6 of the journal volume, block 1. The journal history and the four streams at the end of stage #4 are illustrated in FIG. 2E.

It will be appreciated that journal history 200 is used to rollback storage system 140 to the state that it was in at a previous point-in-time. Journal history is also used to selectively access data from storage 140 at such previous point-in-time, without necessarily performing a rollback. Selective access is useful for correcting one or more files that are currently corrupt, or for simply accessing old data.

Figure 3:
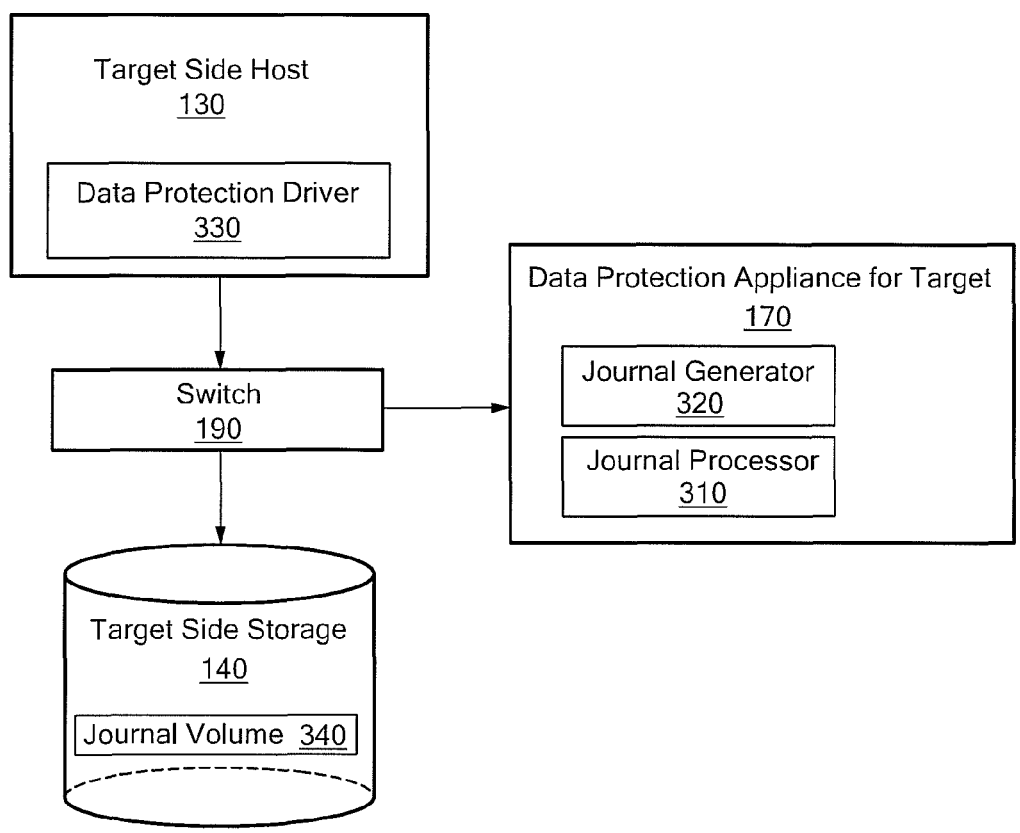
FIG. 3 is a block diagram of an example of a point-in-time data recovery system.

FIG. 3 is a block diagram of a point-in-time data recovery system that includes a target side host 130, target side storage system 140 and target side DPA 170 (see FIG. 1). Target side DPA includes a journal processor 310 and a journal generator 320. Target side host 130 includes a DPA driver 330. Operation of these components is described in detail below. A journal volume 340 resides within storage system 140. DPA drivers are preferably installed on both source side host computer 110 and target side host computer 130. During normal operation, the DPA driver on source side host computer 110 acts as a "splitter", to intercept SCSI I/O commands in its data path, to replicate these commands, and to send a copy to the DPA. A DPA driver may reside on a host computer within a switch, such as switch 150.

Journal history 200 from FIG. 2 may be used to provide an adaptor for access to storage 140 at the state it was in at any specified point-in-time. Since journal history 200 contains the "undo" information necessary to rollback storage system 140, data that was stored in specific memory locations at the specified point-in-time may be obtained by undoing write transactions that occurred subsequent to such point-in-time. In general, however, using journal history 200 in this manner to rollback storage system 140 requires a significant number of I/O requests. At a production data rate of 50 MB/sec. with write transactions of average size 10 KB, each second of journal history 200 includes approximately 5,000 write transactions. To rollback one hour of time, for example, requires undoing 3,600*5,000=18,000,000 transactions.

The present invention provides efficient ways to use journal history 200 by an adaptor to access data that was stored in dynamically changing storage system 140 at a specified point-in-time. As described more fully with respect to FIGS. 4-7 below, journal processor 310 prepares a data structure that optimizes access to data in storage system 140 from a previous state. Journal processor 310 stores at least a portion of such data structure in memory of DPA 170, and host computer 130 indirectly accesses storage system 140 via the data structure in DPA 170. Thus, journal processor 310 serves as an adaptor for accessing storage system 140 at a specified point-in-time.

While the host computer is accessing and processing old data that was stored in storage system 140, new data is being generated through new write transactions. To manage the new write transactions, journal generator 310 preferably generates an auxiliary journal history, dedicated to tracking target side data processing that operates on old data.

Figure 4:
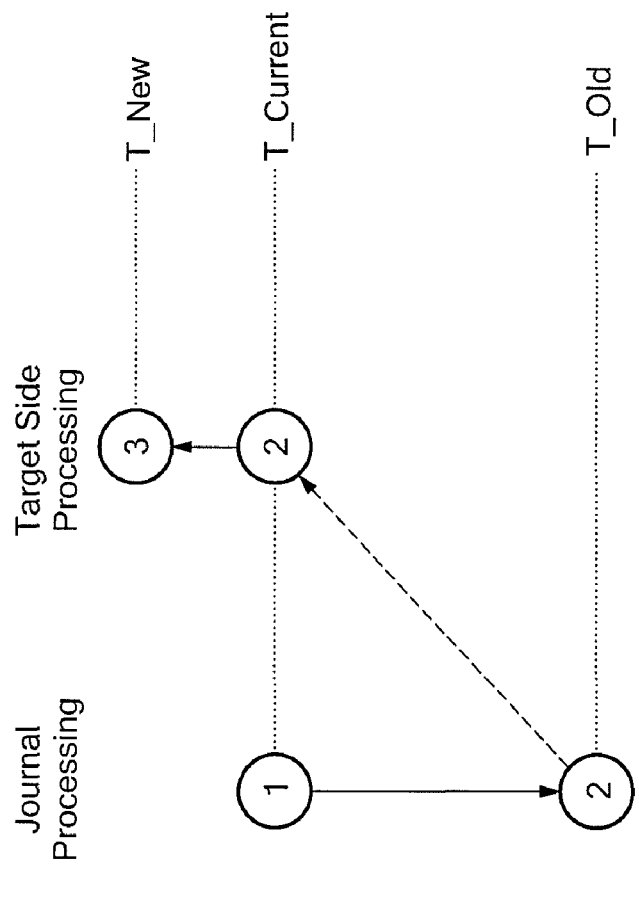
FIG. 4 is an illustration of a time-line for tracking new processing of old data.
Figure 4:
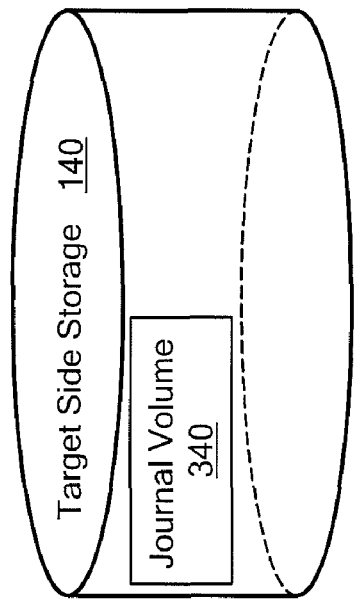

FIG. 4 shows an illustrative time-line for tracking new processing of old data. The journal processor 310 brings the timeline back to a previous time, T_OLD, and journal generator 320 records new write transactions as target side processing brings the timeline forward from time T_CURRENT to T_NEW, thereby skipping the portion of journal history 200 between time T_OLD and T_CURRENT. Current data at time (1) is rolled back to old data at time (2). The rolled back data is used moved up in time to current data (2), thereby effectively skipping over the rolled back data between (1) and (2), which may be corrupt. From current data (2), target side processing advances to new data at time (3); i.e., the target side processing is applied to data (2) and not to data (1). In one implementation, the data between (1) and (2) is not actually skipped over—instead, the DO stream from the auxiliary journal history, stored by journal generator 320, is used instead of the DO stream from the primary journal history 200.

Figure 5:
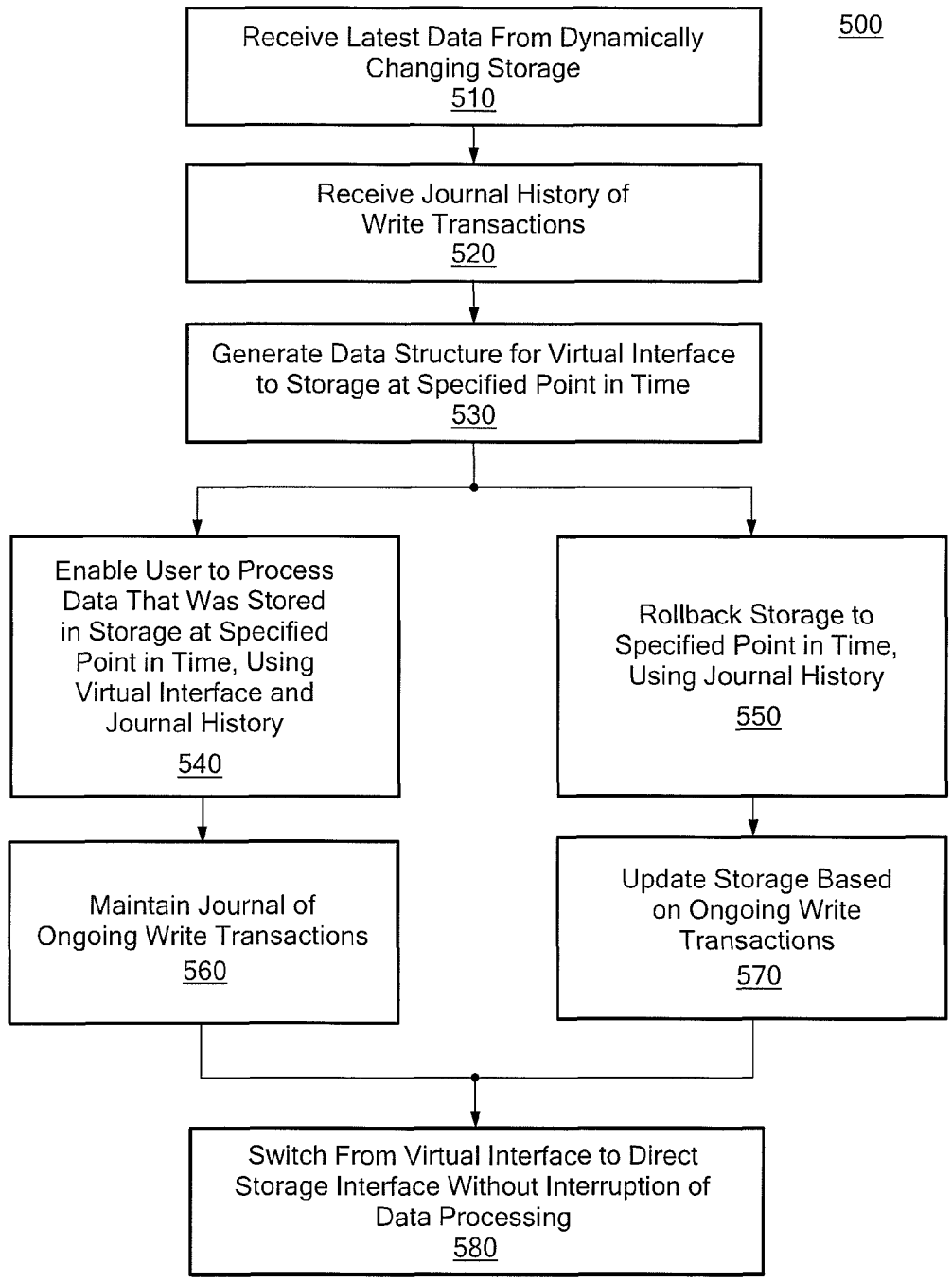
FIG. 5 is a flowchart of an example of a method for point-in-time data recovery.

FIG. 5 is a flowchart of an exemplary method 500 for point-in-time data recovery. At step 510 the method receives access to latest data from a dynamically changing storage, such as storage system 140 of FIG. 1, and at step 520 the method receives access to a journal history 200, such as journal history 200 of FIG. 2.

At step 530 the method generates a data structure for a virtual interface to the storage at the state it was in at a specified earlier point-in-time. In one example, the data structure generated at step 530 is a binary tree, and the data stored in the nodes of the binary tree includes sequential intervals of memory addresses.

Figure 6:
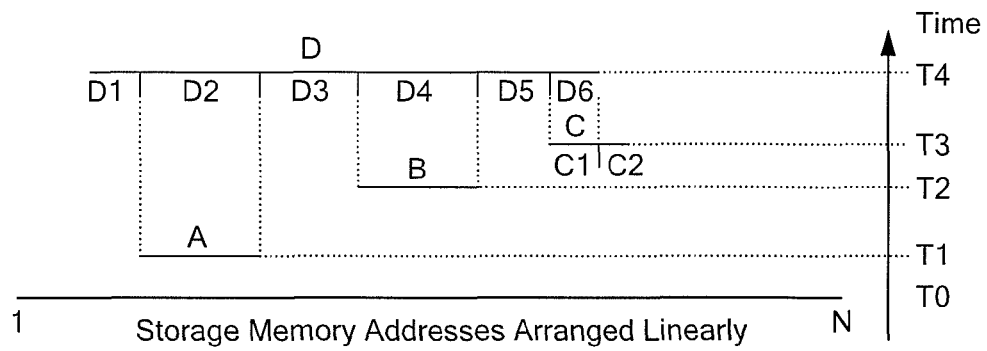
FIG. 6 is an illustration of an example of a binary tree data structure for providing a virtual interface to data that was stored in a storage system at a previous time.
Figure 6:
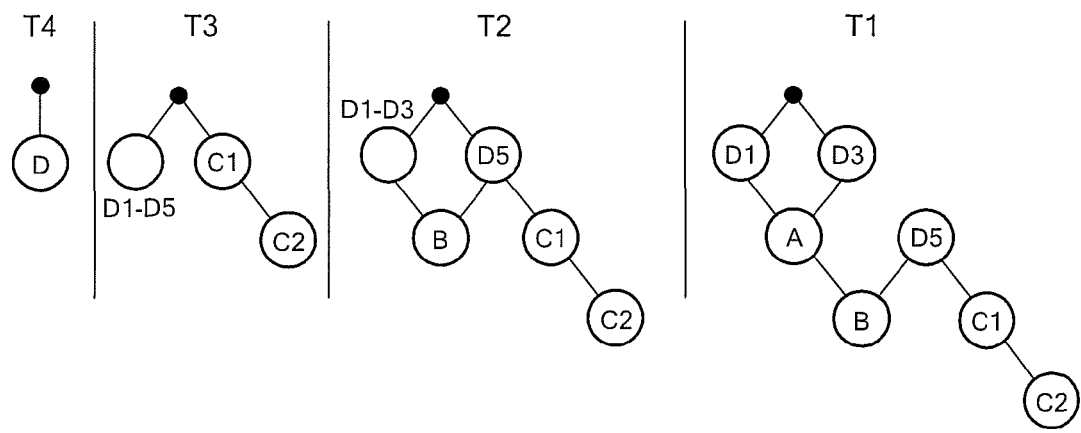

Specifically, reference is now made to FIG. 6, which is a simplified illustration of a binary tree data structure for providing a virtual interface to data that was stored in storage system 140 at a previous time. Shown is a simplified representation of memory addresses in storage system 140 arranged linearly in a sequence from 1 to N. Each write transaction in the journal history includes a plurality of designated memory addresses in which to replace old data with new data. Shown are four such pluralities, corresponding to write transactions of the forms indicated in TABLE II below.

TABLE II

Sample Write Transactions

ID=1; Time T1; Write DATA_A into an interval, A, of memory locations.
ID=2; Time T2; Write DATA_B into an interval, B, of memory locations.
ID=3; Time T3; Write DATA_C into an interval, C, of memory locations.
ID=4; Time T4; Write DATA_D into an interval, D, of memory locations.

The first transaction, with ID=1, writes DATA_A into interval A of memory locations shown in FIG. 6 at time T1, thereby overwriting data that was previously stored in interval A of storage system 140 at time T0. Similarly, the second transaction, with ID=2, writes DATA_B into interval B, at a later time T2, thereby overwriting data that was previously stored in interval B of storage system 140 at time T0; and the third transaction, with ID=3, writes DATA_C into interval C, at a later time T3, thereby overwriting data that was previously stored in interval C of storage system 140 at time T0. The fourth transaction, with ID=4, writes DATA_D into interval D, at a later time T4. It is noted that interval D overlaps with intervals A, B and C. Specifically, interval D is shown in FIG. 6 as being partitioned into non-overlapping subintervals D1-D6. The data written into subintervals D1, D3 and D5 overwrites the data that was previously stored in these subintervals of storage 140 at time T0. However, the data written into subinterval D2, which is the same as interval A, overwrites DATA_A, which was written into subinterval A at time T1. Similarly, the data written into subinterval D4, which is the same as interval B, overwrites DATA_B, which was written into subinterval B at time T2. The data written into subinterval D6, which is a subset of interval C, overwrites a portion of DATA_C; namely, the portion written into subinterval C1.

The journal entries in TABLE II are processed in reverse chronological order; i.e., from ID=4 to ID=1. Such order corresponds to a last-in-first-out order, since the journal entries were written in order from ID=1 to ID=4. As shown in FIG. 6, when each successive journal entry from ID=4 to ID=1 is processed, one or more nodes are added to successive binary trees. The binary tree at time T4 consists of a single root node, and a single node underneath the root that records the interval D, and the location in journal history 200 of DATA_D. The next binary tree, at time T3, includes additional nodes for C1 and C2; and the node recording interval D has been changed to record the interval D1-D5. Again, in addition to recording the intervals, the nodes of the binary tree also record the location in journal history 200 of the data corresponding to the intervals.

At time T2 the binary tree the interval D1-D5 is broken down into intervals D1-D3, D4 and D5, and two additional nodes are appended to the binary tree. Finally, at time T2, the interval D1-D3 is broken down into intervals D1, D2 and D3, and two additional nodes are appended to the binary tree, thereby generating the rightmost binary tree shown at the bottom of FIG. 6.

The binary tree structure thus generated provides, at a time such as T>T4, indirect access to the data that was in storage system 140 at an earlier time T<T1. For a given memory address, the binary tree is traversed to find an interval containing the given address. If such interval is located in a node of the binary tree, then the node also provides the location in journal history where the data can be extracted. Otherwise, if such interval is not located, then the data can be extracted from the latest state of the storage at time T4.

A disadvantage of the binary tree data structure is that storage of the binary tree requires a significant amount of memory with the DPA 170, and may exceed the DPA memory capacity. In one example, which generally requires less DPA memory, the data structure generated at step 530 includes one or more sorted lists, each list storing data from write transactions in journal history 200, as described in detail herein.

Figure 7:
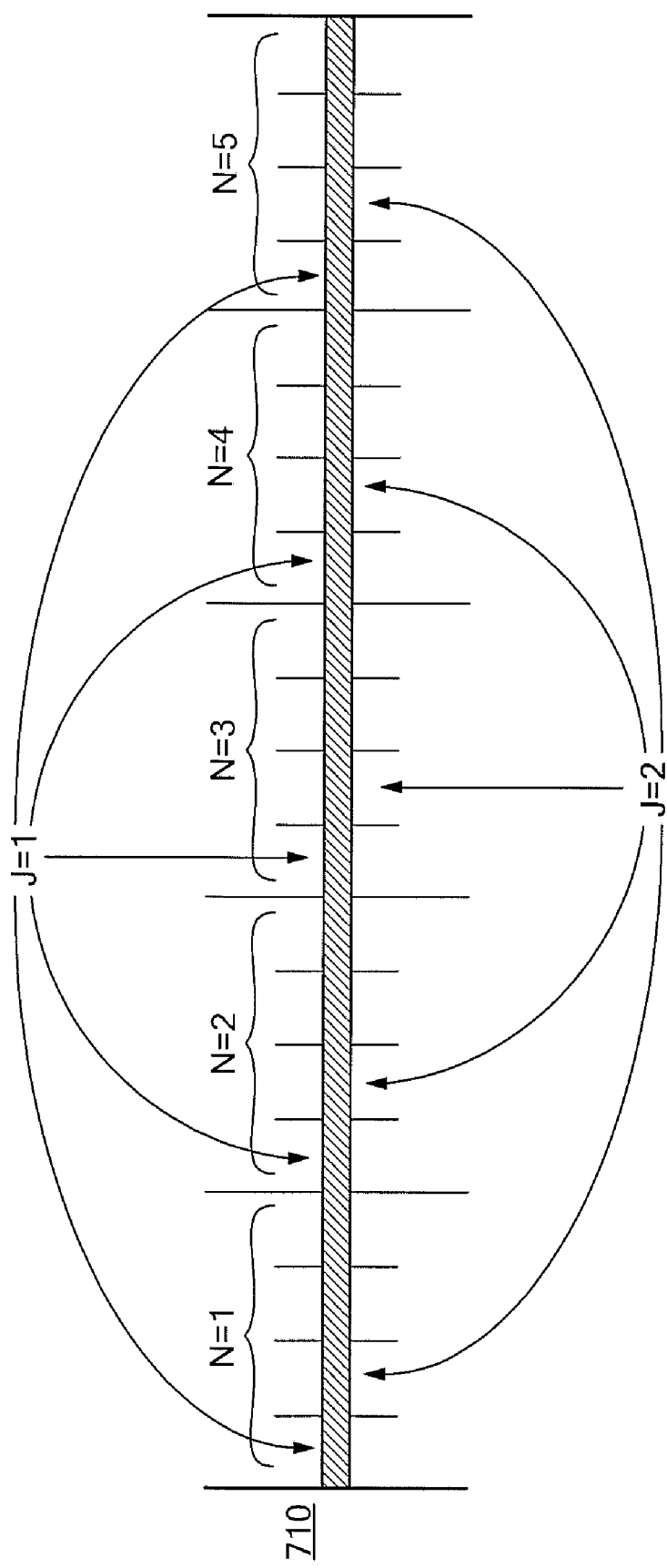
FIG. 7 is an illustration of an example of a sorted list data structure for providing a virtual interface to data that was stored in a storage system at a previous time.

Reference is now made to FIG. 7, which is a simplified illustration of a sorted list data structure for providing a virtual interface to data that was stored in a storage at a previous time. Shown is a representation of memory addresses in storage system 140 as a linear sequence 710. The memory addresses are partitioned into interval bins designated by N=1, N=2, etc. The illustrated setup has five such bins. For example, if linear sequence 710 includes 1 TB of memory, then each bin spans 200 GB. In turn, each bin is further partitioned into sub-bins. The setup has four sub-bins per bin, each sub-bin spanning 50 GB. For example, the number of bins may be on the order of 100, and the number of sub-bins may be on the order of 100 sub-bins per bin. However, for the sake of clarity, the illustrative setup is shown with fewer bins and sub-bins.

An instant recovery request with a specified point-in-time triggers generation of ordered lists, as follows. The UNDO METADATA stream is parsed and binned appropriately according to data volume location. For each bin, a binary tree structure of non-overlapping intervals located within the bin, and ordered by beginning storage address, is generated as described above with respect to FIG. 6; and the binary tree entries are stored within the bin.

The various corresponding sub-bins of each bin are grouped together into ordered lists, designated by J=1, J=2, etc. The ordered list for J=1 includes the pluralities of memory addresses associated with write transactions subsequent to time T1, that store new data into memory addresses located within the sub-bins associated with J=1. The entries in the list, namely, the various pluralities of memory addresses, are sorted in linear order based on the lowest addresses therein. For example, using the sizes as above, the 10K blocks of memory starting at addresses 24G, 213G, 448G, 601G and 836G would each be stored in the J=1 list; and the 10K blocks of memory starting at addresses 174G, 361G and 589G would each be stored in the J=4 list.

The data within the bins may require a significant amount of memory storage. To this end, the ordered lists themselves are stored within storage system 140; and a filtered sub-list is stored in memory of DPA 170, the filtered sub-list including only every $M^{th}$ entry from the full list. For example, if M=1000, then each $100^{th}$ entry in a full list is stored in the sub-list. Alternatively, the filtered sub-list may include only one entry from each GB of storage locations.

The sorted lists and sub-lists thus generated provide a virtual interface to the data that was stored in storage system 140 at time T<T1. Given a specific memory address, the appropriate sub-bin is readily identified. The entries of the corresponding sub-list are searched to identify two bounding addresses, one below and one above the specific memory address. The two entries in the sub-list preferably include pointers to positions in the full lists that they correspond to and, using these pointers, a search is made of the full list between the two pointers. For example, suppose the specified memory address is 24G+178M+223K+66. Then the relevant sub-list is J=1. Suppose further that the entries 24G+13M and 32G+879M are located in the sub-list for J=1 at locations corresponding to locations 122,001 and 123,000 in the full list for J=1. Then the full sorted list can be searched over the 1,000 entries between 122,001 and 123,000 to locate an entry that contains the specified memory address 24G+178M+223K+66. If such an entry is located, then the UNDO data from the corresponding write transaction is the sought after data. Otherwise, if such an entry is not located, then the data currently in storage system 140 is the sought after data.

It may be appreciated that the advantage of combining sub-bins in a cyclical arrangement, as illustrated in FIG. 7, is that often write transactions are concentrated about small portions of memory. During data processing it is common for I/O requests to be clustered around a relatively small portion of storage, referred to as a "hot spot." Using cyclically arranged sub-bins often results in such write transactions being confined within relatively small intervals within the lists, thus making it easier to search through them. In distinction, using consecutive sub-bins would result in such transactions being confined within large intervals, making it more difficult to search through them.

The first and second examples, illustrated in FIGS. 6 and 7 respectively, and described above, are preferably triggered by a user request for access to data from an earlier point-in-time. In a third example, a data structure is generated in background during normal course of production operation. Whenever data is written to a data volume and UNDO data is recorded in a journal history, the UNDO data is also buffered in memory. When the buffer is full, the buffer entries are sorted by storage address into a sorted list, and the sorted list is written to the journal volume. Preferably, the sorted list is arranged according to a binary tree structure. Alternatively, the sorted list may be arranged in sequential order. The sorted lists, themselves, are chronologically ordered according to the times that data was written to the data volume. Subsequently, when a user requests recovery to a previous point-in-time, the sorted lists are merged.

It will be appreciated that the data structures shown in FIGS. 6 and 7 may be used to access data that was stored in storage system 140 at an earlier point-in-time T<T1. In certain circumstances it may be desired to rollback storage system 140 to time T<T1; in other circumstances it may only be desired to access data from T<T1, without a storage rollback.

The data structures shown in FIGS. 6 and 7 are used for source side data recovery; i.e., for recovering data that was in target storage system 140 at time T<T1, in situations where the data in source side storage system 120 became corrupt afterwards. Source side storage system 120 may have become corrupt due to a disaster at the physical site housing storage system 120, or due to a computer virus, or due to human error. Whatever the cause of the disaster, the data recovery system may be used to restore storage system 120 to the state it was in at time T<T1, prior to the disaster.

Referring back to FIG. 5, at step 540 a user processes data from a previous point-in-time, using the virtual interface and the journal history, as described above with reference to FIGS. 6 and 7. Simultaneously while the user is processing data from the previous point-in-time using the virtual interface, at step 550 a full rollback of the storage system is performed in parallel. At step 560 an auxiliary journal history of write transactions is recorded, reflecting the I/O requests originating from the user's data processing at step 540. At step 570, in parallel with step 560, the storage system is updated by applying write transactions recorded in the auxiliary journal history. Finally, at step 580 a seamless switch is made from the virtual interface to a direct interface for accessing the storage system. Accomplishing such a seamless switch involves connections between logical units and physical storage, and is described in detail with respect to FIG. 8 below.

In general, physical storage systems may store data in a variety of physical devices, such as disks, arrays of disks and disks on key. Physical storage systems include computers that act as controllers, which manage storage of data. Logical units are virtual storage devices, exposed by the controllers. The physical storage systems have the capability of responding to commands issued to logical units.

Generally, a host operating system creates devices for every logical unit it identifies. Such a device is characterized by (i) its logical units, and (ii) its data source; and this characterization is referred to as the device's "personality." Data may arrive at a first logical unit, A, via a second logical unit, B. In one example, data recovery is achieved by changing a data source.

Figure 8:
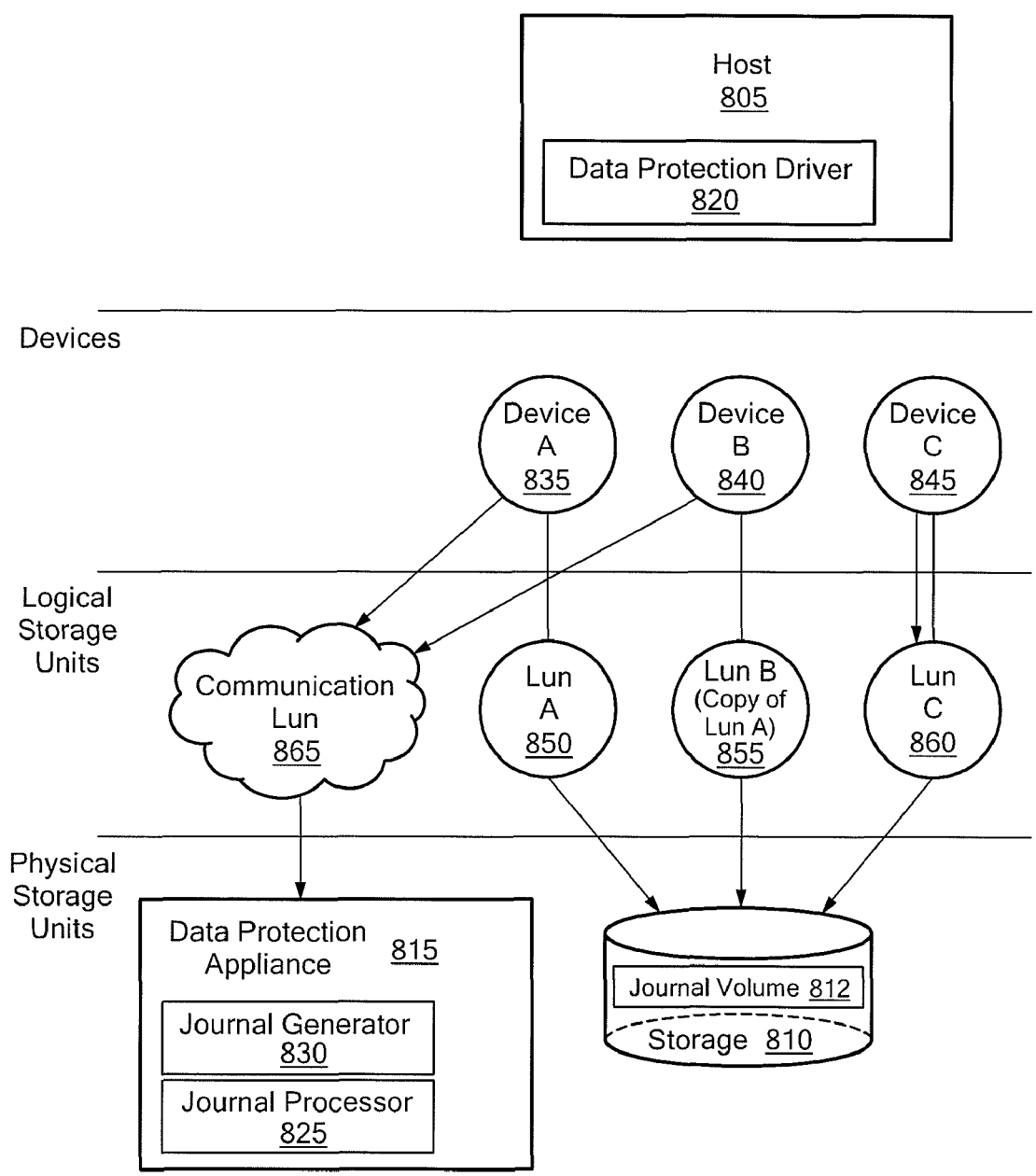
FIG. 8 is an illustration of an example of a structure used for providing a virtual interface to data that was stored in a dynamically changing storage at a specified point-in-time.

Reference is now made to FIG. 8, which is a simplified illustration of a structure used for providing a virtual interface to data that was stored in a dynamically changing storage at a specified point-in-time. The structure includes a host computer 805, a storage system 810, and a DPA 815. Host computer 805 includes a data protection driver 820. DPA 815 includes a journal processor 825 and a journal generator 830, as described above with reference to FIG. 3, for example. Host computer 805 has access to three devices 835, 840 and 845, designated respectively as Device A, Device B and Device C. Each device is associated with a logical unit number (LUN), 850, 855 and 860, designated as LUN A, LUN B and LUN C, respectively. In turn, each LUN is associated with one or more memory volumes in storage system 810.

The association of a LUN with one or more memory volumes in storage system 810 is flexible. For example, as shown in FIG. 8, LUN B may access the same memory volumes as does LUN A, thus serving as a copy of LUN A. In one example, a communication LUN 865 is configured so as to access storage 810 indirectly, via DPA 815. To a user of host computer 805 this may be transparent; i.e., the user is unaware of whether the LUN for a device is accessing storage system 810 directly, or indirectly.

During a recovery rollback, write transactions in journal history 200 are undone, so as to restore storage system 810 to the state it was at, at time T1. Generally it takes a significant amount of time to perform a full rollback of storage system 810. In the meantime, while the rollback is occurring, indirect access to the rolled back data is enabled via the data structures illustrated in FIGS. 6 and 7. Thus, a user of host computer 805 is able to access and process the rolled back data, via communication LUN 865, before the full rollback operation is complete.

As the user processes the rolled back data via communication LUN 865, an auxiliary journal history is maintained, for recording write transactions applied to the rolled back data, as illustrated in FIG. 4. Had the user been accessing storage system 810 directly, via a direct LUN, the write transactions would be entered to the rolled back journal history. However, while the full rollback operation is occurring, the journal history cannot be rolled back. Instead, an auxiliary journal history is maintained.

After the rollback operation is complete, and storage 805 has been rolled back to its earlier state at time T1, the journal history can also be rolled back by deleting the write transactions that were undone during the rollback operation. The auxiliary journal history can then be appended to the rolled back journal, thereby combining the two histories into a single journal going forward. At that point, communication LUN 865 can be switched to a LUN with direct access to storage system 810, resulting in a seamless transition from indirect to direct access, without interruption of the user's data processing.

It will be appreciated that the architecture of FIG. 8 enables rollback to a multiplicity of previous points-in-time. For rollback to single point-in-time, it suffices to use a single LUN. For rollback to multiple points-in-time, additional LUNs are created, so as to generate additional devices in the host. Creation of additional LUNs may be performed by a user, or by a DPA. In one example, the DPA creates small additional LUNs, which serve to provide device "personalities" as described above; and the DPA uses a physical LUN for storage rollback, which provides user access to multiple points-in-time, while simultaneously rolling back storage system 810. Thus it will be appreciated that multiple devices may be configured to access storage system 810 indirectly through communication LUN 865, each device being used to access data having a different age. Device A can be used to access data that was stored in storage system 810 at a first earlier time T1, and Device B can be used to access data from a second earlier time, T2.

In one aspect of the invention, the journal techniques described herein may be applied to consolidating snapshots. For example, a user may save snapshots daily; however, the user over the course of several months may not need the granularity of having snapshots saved each and every day or may not have the storage capacity to store that much data. In this example, the user may choose to consolidate the daily snapshots to weekly snapshots for daily snapshots older than one month. Further, the user may choose to consolidate the weekly snapshots to monthly snapshots for monthly snapshots older than a year and so forth. In other examples, a user may choose to designate consecutive snapshots to consolidate by selecting a corresponding start time and end time. In another example, in a continuous data protection environment, a user may choose not to include point-in-time snapshots older than a few hours or a few days, for example. In other examples, consolidated snapshots are selected by a user to occur automatically (e.g., daily, weekly, monthly and so forth).

Figure 9:
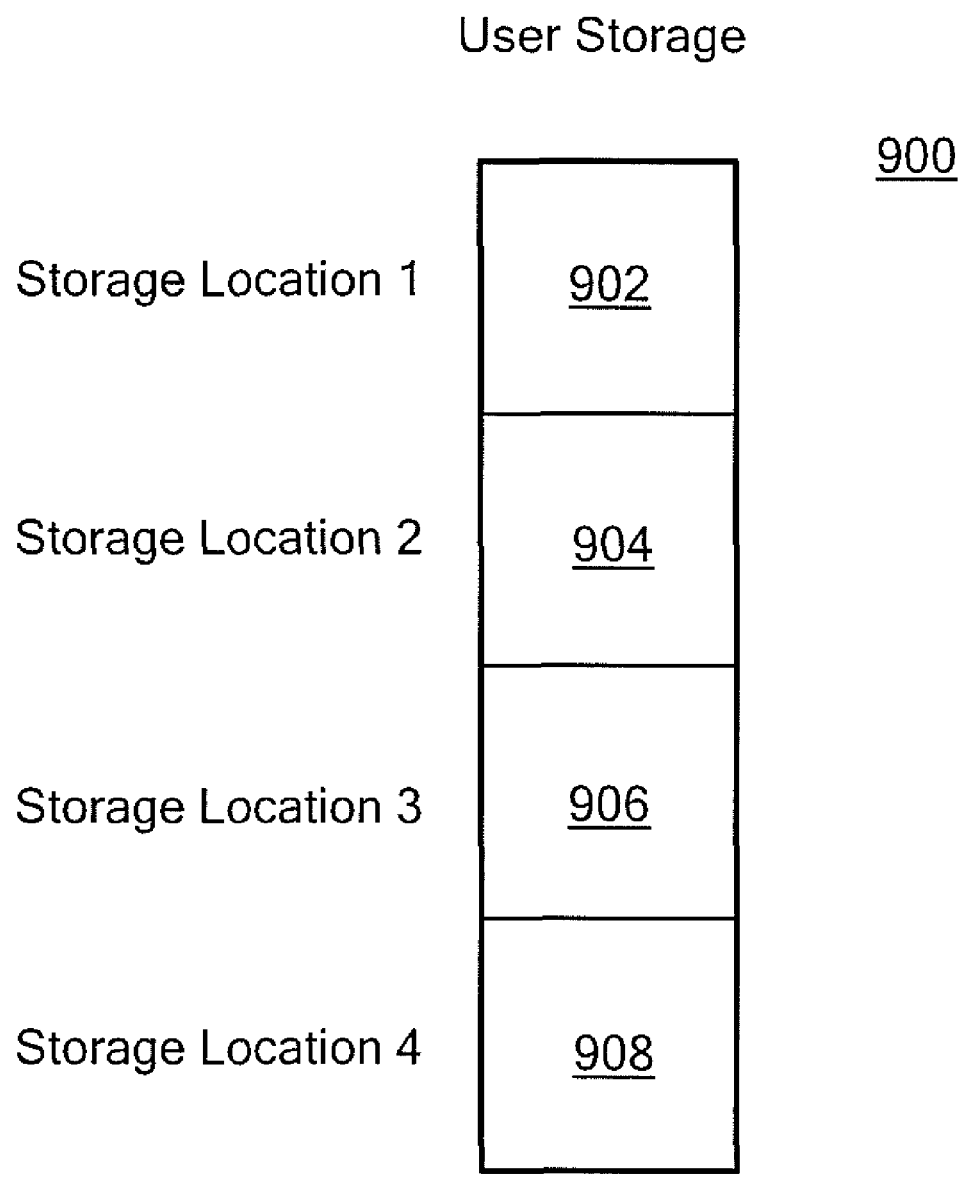
FIG. 9 is block diagram of a user storage.
Figure 10A:
FIG. 10A is diagram depicting a journal of a DO METADATA stream before consolidation of snapshots.
Figure 10B:
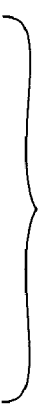
FIG. 10B is a diagram depicting a journal of the DO METADATA stream after consolidation.

Referring to FIGS. 9 to 10B, in one particular example, a user data storage 900 includes four data storage locations: a first data storage location 902 designated as data storage location 1, a second data storage location 904 designated as data storage location 2, a third data storage location 906 designated as data storage location 3 and a fourth data storage location 908 designated as data storage location 4. A journal 1000 for a DO METADATA stream is used to record the locations of the changes for each storage location 902-908 in the user storage 900. The journal 1000 includes columns representing time increments, the storage locations that changed since the previous snapshot and the data now stored in the changed storage locations. For example, for time increment 1, the second data storage location 904 is updated with data "a" and for time increment 6, the second data storage location 904 is updated again replacing data "a" with data "f." In this simple example, only one data location has changed for each snapshot; however, multiple changes may occur during each snapshot.

In one example, a user may choose to consolidate the snapshots taken from time increment 3 though time increment 8 resulting in a journal 1000'. In particular, a portion 1010 of the journal 1000 is replaced by a portion 1010'. Using the journal 1000' the snapshot taken at time increments 3 to 7 may no longer be accessed so that the granularity over time increments 3 to 7 is reduced because the intermediate changes are no longer available.

Figures 11, 12:
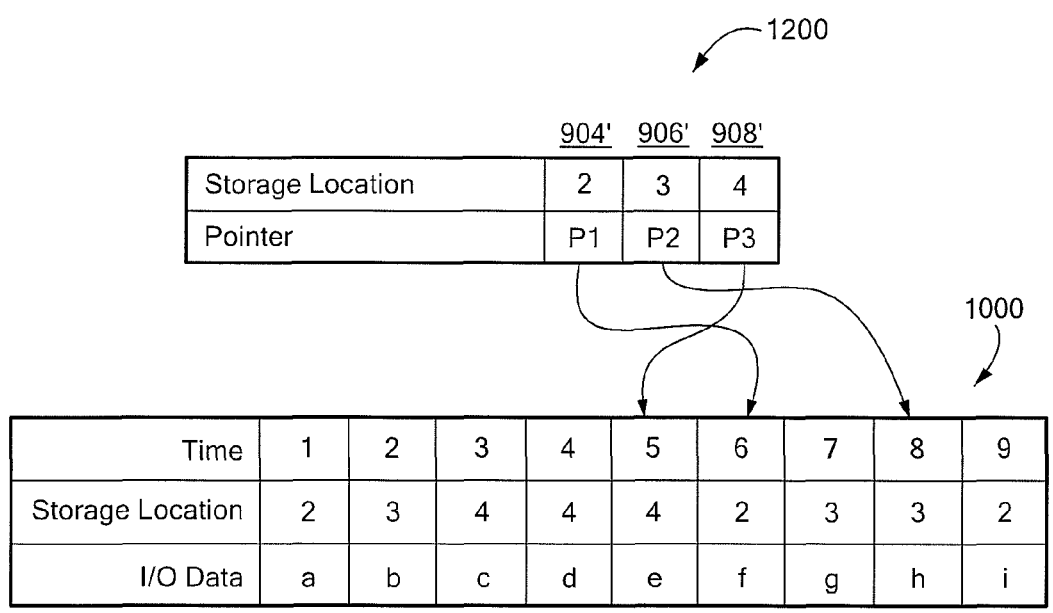
FIG. 11 is a diagram depicting a temporary stream containing the consolidated data.
FIG. 12 is a block diagram showing the relationship between a data structure and the journal of the DO METADATA stream.

Referring to FIGS. 11 and 12, in one example, in order to generate the journal 1000', a temporary stream 1010' is created containing the latest changes in each data storage location in the time increments 3 through 8. The temporary stream 1010' is used to replace the portion 1010 in the journal 1000 to form the journal 1000'. In one example, the temporary stream is stored in the journal 340 (FIG. 3) with the DO stream, the UNDO stream the DO metadata stream and the UNDO metadata stream. The temporary stream 1010' is formed by using a data structure 1200 having data storage locations 904', 906', 908' corresponding to the data storage location 904-908 of the user storage 900 (FIG. 9). In one example, the data structure 1200 is stored in the journal 340 (FIG. 3). Each storage location has a corresponding pointer P1, P2, P3, pointing to the data in the journal containing the latest change to the corresponding storage location 904, 906, 908. For example, a data storage location 904' includes a pointer, P1 pointing to the time increment 6 snapshot, containing the latest change to the second storage location 904, a data storage location 906' includes a pointer, P2 pointing to the time increment 8 snapshot, containing the latest change to the third storage location 3 906 and a data storage location 908' includes a pointer, P3 pointing to the time increment 5 snapshot, containing the latest change to the fourth storage location 908. Using the data structure 1200, for each storage location, data is read from the DO stream, and written to the temporary stream 1010' forming the consolidated snapshot.

Referring to FIG. 13, one example of consolidating snapshots using a journal is a process 1300. The user sends user inputs designating the snapshot criteria (1302). For example, the user input may include a start time and end time to consolidate two or more snapshots to a single snapshot. In another example, the user may set automatic consolidation criteria. For example, the automatic consolidation criteria may include criteria to consolidate daily snapshots to weekly snapshots for daily snapshots older than one month or to consolidate the weekly snapshots to monthly snapshots for monthly snapshots older than a year and so forth. In one example, the user uses a graphical user interface (e.g., a graphical user interface 1410 (FIG. 14)) to enter the user inputs.

Once the snapshots selected for consolidation are identified, the temporary stream 1010' is created (1312) and saved in the journal 340 (1322). The temporary stream 1010' is formed from reading the data structure 1200 and determining the latest changes for each data storage location 902-908 affected during the selected snapshots and writing them to the temporary stream 1010'. The journal 1000 is updated by replacing the old consolidated area 1010 with the temporary stream 1010' representing the consolidated snapshot (1336).

In one example, to form the data structure 1200, the relevant parts of the DO metadata stream are read and then the metadata is sorted by data location. If there are several writes to the same location a pointer to the latest write transaction is kept. In order to perform the sorting process, the entire DO METADATA stream is read into memory of the DPA 170. In some examples, the entire DO metadata stream cannot be read because the memory of the DPA 170 is too small. For example, if the total amount of data changed in the DO stream is 1TB and 10 size averages 8 KB, the DO METADATA stream for the IOs will be around 6 GB, which might be more than the memory of the DPA 170. In order to account for this, sorting is done piecemeal. For example, the data locations are divided into portions and the DO METADATA stream is divided into substreams, for example, 50 substreams. Each substream contains metadata of a corresponding portion of the data locations. Each such substream is read into the memory of the DPA 170 and sorted keeping a latest stream pointer for each change to the volume and subsequently saved back to the corresponding substream. Each substream is then pieced back together to form the result in the data structure 1200.

While FIGS. 9 to 13 focus on consolidating snapshots using a journal of the DO METADATA stream, it understood that the same techniques may be used using a journal for an UNDO METADATA stream. For example, in consolidating the snapshots corresponding to the time increments 3 to 8, the oldest data in each location is used, i.e., the consolidated snapshot will contain the oldest version of each storage location instead of the latest version of each storage location.

FIG. 14 is an example of a computer 1400, which may be used to execute all or part of the process of 1300. Computer 1400 includes a processor 1402, a volatile memory 1404, a non-volatile memory 1406 (e.g., hard disk), for example, and a graphical user interface 1410 (e.g., a mouse, a keyboard, a touch screen and so forth). Non-volatile memory 1406 includes an operating system 1416, journal data 1418 (e.g., a DO stream, an UNDO stream, a DO Metadata stream, an UNDO metadata stream and a temporary stream) and computer instructions 1412 which are executed out of volatile memory 1404 to perform all or part of process 1300.

The processes described herein (e.g., process 1300) are not limited to use with the hardware and software of FIG. 14; they may find applicability in any computing or processing environment and with any type of machine or set of machines that is capable of running a computer program. The processes may be implemented in hardware, software, or a combination of the two. The processes may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 1300, for example, and to generate output information.

The processes described herein are not limited to the specific embodiments described herein. For example, the processes are not limited to the specific processing order of the processing blocks in FIGS. 5 and 13. Rather, any of the processing blocks of FIGS. 5 and 13 may be re-ordered, combined or removed, performed in parallel or in serial, as necessary, to achieve the results set forth above.

Processing blocks in FIGS. 5 and 13 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method of consolidating snapshots, comprising:
   storing snapshots using a journal in a continuous data protection environment, each entry of the journal corresponding to one of a unique group of DO METADATA stream data blocks and a unique group of UNDO METADATA stream data blocks;
   receiving a user input designating at least two snapshots to consolidate;
   storing changes to data blocks from the at least two snapshots in a temporary stream on the journal, storing changes comprising storing one of the oldest changes of the UNDO METADATA stream data blocks and the latest changes of the DO METADATA stream data blocks; and
   consolidating the at least two snapshots by replacing the at least two snapshots in the journal with a single consolidated snapshot comprising the changes for each data block from the temporary stream.

2. The method of claim 1 wherein receiving a user input designating at least two snapshots to consolidate comprises receiving user inputs designating a start time and an end time.

3. The method of claim 1 wherein receiving a user input designating at least two snapshots to consolidate comprises receiving user inputs designate a time to consolidate the at least two snapshots data.

4. The method of claim 1, wherein receiving a user input designating at least two snapshots to consolidate comprises consolidating snapshots on a regular basis as determined by a user.

5. The method of claim 1, further comprising:
   forming the temporary stream using a data structure comprising pointers associated with the changes to the data blocks; and
   updating the journal with the temporary stream.

6. The method of claim 5, further comprising:
   dividing one of DO METADATA stream and the UNDO METADATA stream into substreams, each substream associated with a portion of the data blocks;
   sorting the substreams; and
   writing the substreams to data structure.

7. An apparatus to consolidate snapshots, comprising:
   circuitry to:
   store snapshots using a journal in a continuous data protection environment, each entry of the journal corresponding to one of a unique group of DO METADATA stream data blocks and a unique group of UNDO METADATA stream data blocks;

receive a user input designating at least two snapshots to consolidate;

store changes to data blocks from the at least two snapshots in a temporary stream on the journal, storing changes comprising storing one of the oldest changes of the UNDO METADATA stream data blocks and the latest changes of the DO METADATA stream data blocks; and consolidate the at least two snapshots by replacing the at least two snapshots in the journal with a single consolidated snapshot comprising the changes for each data block from the temporary stream.

8. The apparatus of claim 7 wherein the circuitry comprises at least one of a processor, a memory, programmable logic and logic gates.

9. The apparatus of claim 7 wherein the circuitry to receive a user input designating at least two snapshots to consolidate comprises circuitry to receive user inputs designating a start time and an end time.

10. The apparatus of claim 7 wherein the circuitry to receive a user input designating at least two snapshots to consolidate comprises circuitry to receive user inputs designate a time to consolidate the at least two snapshots data.

11. The apparatus of claim 7 wherein the circuitry to receive a user input designating at least two snapshots to consolidate comprises the circuitry to consolidate snapshots on a regular basis as determined by a user.

12. The apparatus of claim 7, further comprising circuitry to:
form a temporary stream using a data structure comprising pointers; and
update the journal with the temporary stream.

13. The apparatus of claim 7, further comprising circuitry to:
divide one of DO METADATA stream and the UNDO METADATA stream into substreams, each substream associated with a portion of the data blocks;
sort the substreams; and
write the substreams to data structure.

14. An article comprising:
a non-transitory machine-readable medium that stores executable instructions to consolidate snapshots, the instructions causing a machine to:
store snapshots using a journal in a continuous data protection environment, each entry of the journal corresponding to one of a unique group of DO METADATA stream data blocks and a unique group of UNDO METADATA stream data blocks;
receive a user input designating at least two snapshots to consolidate;
storing changes to data blocks from the at least two snapshots in a temporary stream on the journal, storing changes comprising storing one of the oldest changes of the UNDO METADATA stream data blocks and the latest changes of the DO METADATA stream data blocks; and
consolidate the at least two snapshots by replacing the at least two snapshots in the journal with a single consolidated snapshot comprising the changes for each data block from the temporary stream.

15. The article of claim 14 wherein instructions causing a machine to receive a user input designating at least two snapshots to consolidate comprises instructions causing a machine to receive user inputs designating a start time and an end time.

16. The article of claim 14 wherein instructions causing a machine to receive a user input designating at least two snapshots to consolidate comprises instructions causing a machine to receive user inputs designate a time to consolidate the at least two snapshots data.

17. The article of claim 14 wherein instructions causing a machine to receive a user input designating at least two snapshots to consolidate comprises instructions causing a machine to consolidate snapshots on a regular basis as determined by a user.

18. The article of claim 14, further comprising instructions causing a machine to:
form the temporary stream using a data structure comprising pointers associated with the changes to the data blocks; and
update the journal with the temporary stream.

19. The article of claim 18, further comprising instructions causing a machine to:
divide one of DO METADATA stream and the UNDO METADATA stream into substreams, each substream associated with a portion of the data blocks;
sort the substreams; and
write the substreams to data structure.

* * * * *